United States Patent
Sato

(10) Patent No.: US 6,967,040 B2
(45) Date of Patent: Nov. 22, 2005

(54) METHOD OF TREATING CURED RUBBER

(75) Inventor: Shinichi Sato, Gunma-ken (JP)

(73) Assignee: Shin-Etsu Chemical Co., Ltd., Tokyo (JP)

(*) Notice: Subject to any disclaimer, the term of this patent is extended or adjusted under 35 U.S.C. 154(b) by 59 days.

(21) Appl. No.: 10/676,027

(22) Filed: Oct. 2, 2003

(65) Prior Publication Data

US 2004/0072967 A1 Apr. 15, 2004

(30) Foreign Application Priority Data

Oct. 4, 2002 (JP) ........................ 2002-292079

(51) Int. Cl.$^7$ ................................ B05D 1/02
(52) U.S. Cl. .............................. 427/255.18; 427/255.6; 427/387
(58) Field of Search ................ 427/225.6, 225.18, 427/387

(56) References Cited

U.S. PATENT DOCUMENTS

| | | | | |
|---|---|---|---|---|
| 4,304,805 A | * | 12/1981 | Packo et al. ............. | 428/63 |
| 4,789,564 A | * | 12/1988 | Kanner et al. ........... | 427/255.6 |
| 5,736,251 A | * | 4/1998 | Pinchuk ................... | 428/447 |
| 6,410,641 B2 | | 6/2002 | Sato et al. | |

FOREIGN PATENT DOCUMENTS

| | | |
|---|---|---|
| DE | 32 03 698 A1 | 9/1982 |
| EP | 0 587 295 A1 | 3/1994 |
| EP | 0 676 445 B1 | 8/2000 |
| EP | 1125973 A | 8/2001 |
| EP | 1 125 973 * | 8/2001 |
| JP | 8-198926 A | 8/1996 |
| JP | 2000-80190 A | 3/2001 |
| JP | 2001-220469 A | 8/2001 |

* cited by examiner

*Primary Examiner*—Margaret G. Moore
(74) *Attorney, Agent, or Firm*—Birch, Stewart, Kolasch & Birch, LLP

(57) ABSTRACT

A curable rubber composition comprising a curable organopolysiloxane or perfluoropolyether group-containing organosilicon compound, a curing agent, and a silica filler having a mean particle size of 0.001–10 μm is cured into a cured rubber. For improving compression set, the cured rubber is post treated with a hydrolyzable aminosilane or amidosilane having a Si—N bond in vapor form.

8 Claims, No Drawings

METHOD OF TREATING CURED RUBBER

TECHNICAL FIELD

This invention relates to a method of treating silica-filled rubber in the cured state, and more particularly, to a treating method for producing cured rubber having improved compression set and suitable for use as O-rings and similar parts in fuel, lubricant and working fluid systems of automobiles and the like.

BACKGROUND ART

The compression set of silica-filled rubber largely differs with the amount and type of silica filler, wettability of silica filler with rubber, and other factors. For the purpose of improving the compression set, investigations have heretofore been made on the amount and type of silica filler and a variety of wetters for improving the wettability of silica filler.

Prior art approaches are successful in improving the compression set to some extent, however, better compression sets are required in some applications. There is a desire to have cured rubber having an improved compression set.

The inventors proposed in JP-A 2001-220469, U.S. Pat. No. 6,410,641 and EP 1125973A, which are incorporated herein by reference, a method of treating cured rubber with a hydrolyzable aminosilane or amidosilane having a Si—N bond for thereby producing cured rubber having improved compression set.

This method achieves an improvement in compression set, but requires to use large amounts of hydrolyzable aminosilane or amidosilane. Even when a solvent for swelling rubber is used in combination, large amounts of liquid are necessary. At the end of immersion, the cured rubber has been swollen. In order for the cured rubber to resume the original shape, the swelling liquid must be removed, which needs a cumbersome operation. A further improvement is desired in this respect.

SUMMARY OF THE INVENTION

It has been found that when a cured rubber made of a curable rubber composition comprising a curable organopolysiloxane or perfluoropolyether group-containing organosilicon compound, a curing agent therefor, and a silica filler having a mean particle size of 0.001 to 10 μm is post-treated in a vapor of a hydrolyzable aminosilane or amidosilane having a Si—N bond, there is obtained cured rubber having significantly improved compression set as achieved in U.S. Pat. No. 6,410,641 and EP 1125973A. The amount of hydrolyzable aminosilane or amidosilane used, which is the drawback of our previous proposal, can be reduced to the necessary minimum level. The degree of swelling of cured rubber during the post treatment is low so that the removal of swelling liquid is easy.

In a first aspect, the invention provides a method for the treatment of a cured rubber made of a curable rubber composition comprising a curable organopolysiloxane, a curing agent therefor, and a silica filler having a mean particle size of 0.001 to 10 μm, by post-treating 100 parts by weight of the cured rubber with 0.5 to 30 parts by weight of a hydrolyzable aminosilane or amidosilane having a Si—N bond in vapor form.

In a second aspect, the invention provides a method for the treatment of a cured rubber made of a curable rubber composition comprising a curable perfluoropolyether group-containing organosilicon compound, a curing agent therefor, and a silica filler having a mean particle size of 0.001 to 10 μm, by post-treating 100 parts by weight of the cured rubber with 0.5 to 30 parts by weight of a hydrolyzable aminosilane or amidosilane having a Si—N bond in vapor form.

DESCRIPTION OF THE PREFERRED EMBODIMENT

The cured rubber of the invention is made of either (I) a silicone rubber composition comprising a curable organopolysiloxane, a curing agent therefor, and a silica filler, or (II) a fluororubber composition comprising a curable perfluoropolyether group-containing organosilicon compound, a curing agent therefor, and a silica filler.

In the silicone rubber composition (I), the curable organopolysiloxane is preferably of the following average compositional formula.

In the formula, R, which may be the same or different, stands for substituted or unsubstituted monovalent hydrocarbon groups, preferably of 1 to 12 carbon atoms and more preferably 1 to 8 carbon atoms, for example, alkyl groups such as methyl, ethyl, propyl and butyl; cycloalkyl groups such as cyclohexyl; alkenyl groups such as vinyl, allyl, butenyl and hexenyl; aryl groups such as phenyl and tolyl; aralkyl groups such as benzyl and β-phenylpropyl; and substituted ones of the foregoing groups in which some or all of the hydrogen atoms attached to carbon atoms are replaced by halogen atoms, cyano groups or the like, such as chloromethyl, trifluoropropyl and cyanoethyl. The organopolysiloxane should preferably have at least two alkenyl groups per molecule. Of the R groups, alkenyl groups, especially vinyl groups should preferably account for 0.001 to 10 mol %, especially 0.01 to 5 mol %. The organopolysiloxane is usually end-capped with trimethylsilyl, dimethylvinylsilyl, dimethylhydroxysilyl or trivinylsilyl groups. The letter n is a positive number from 1.98 to 2.02.

The organopolysiloxane preferably has a degree of polymerization of at least about 100, more preferably about 100 to 100,000, and most preferably about 3,000 to 20,000.

Exemplary organopolysiloxanes are given by the structural formulas below.

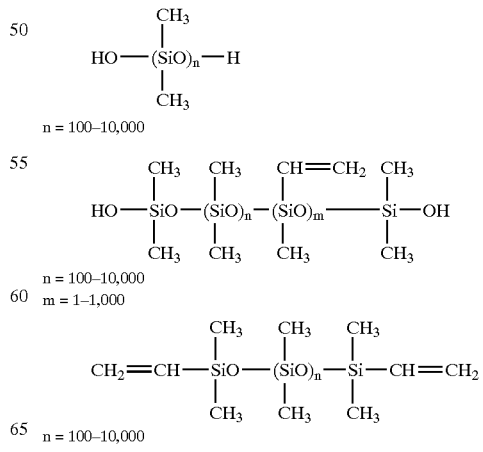

-continued

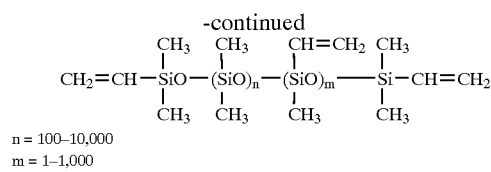

n = 100–10,000
m = 1–1,000

The curing agent used herein is selected as appropriate for the curing mechanism of silicone rubber. For the heat vulcanization type, for example, a curing method using an organic peroxide and an addition curing method using an addition reaction curing agent combined with a catalyst are useful. Typical for the room temperature vulcanization type is a condensation curing method using a condensation crosslinker and a condensation reaction promoting catalyst.

The organic peroxide curing method uses organic peroxide curing agents, for example, chlorine-free organic peroxides such as benzoyl peroxide, p-methylbenzoyl peroxide, o-methylbenzoyl peroxide, 2,5-dimethyl-2,5-di-t-butylperoxy-hexane, t-butylperoxybenzoate, dicumyl peroxide, and cumyl t-butyl peroxide. Especially for atmospheric hot air vulcanization, acyl organic peroxides such as benzoyl peroxide, p-methylbenzoyl peroxide, and o-methylbenzoyl peroxide are preferred.

These organic peroxides may be used alone or in admixture of two or more. An appropriate amount of the organic peroxide added is about 0.1 to 10 parts, and especially about 0.3 to 5 parts by weight per 100 parts by weight of the organopolysiloxane. Too small an amount of the organic peroxide may provide short crosslinking whereas too large an amount may bring no further increase in cure rate.

In the addition reaction curing method, conventional addition reaction curing agents are used. Often an organohydrogenpolysiloxane having at least two, preferably at least three Si—H groups per molecule is used. It is typically represented by the formula:

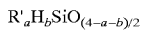

wherein R' is as defined for R, preferably methyl, phenyl or trifluoropropyl, most preferably methyl, and letters "a" and "b" are positive numbers satisfying $0 \leq a < 3$, $0 < b \leq 3$, and $0 < a+b \leq 3$. Examples are methylhydrogenpolysiloxane and copolymers of methylhydrogensiloxane with dimethylsiloxane. The organohydrogenpolysiloxane used herein usually has less than about 400 silicon atoms per molecule. Typical organohydrogenpolysiloxanes are exemplified by the following formula.

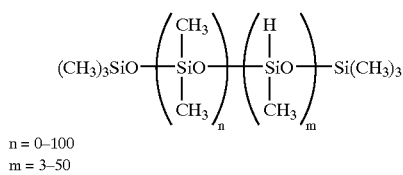

n = 0–100
m = 3–50

The organohydrogenpolysiloxane is preferably added in such amounts that 0.5 to 3 mol of Si—H groups are available per mol of alkenyl groups in the organopolysiloxane.

For the rubber to be cured through addition reaction or hydrosilylation reaction, addition reaction promoting catalysts, typically platinum group compounds are preferably used. The platinum group compound serves to promote the addition reaction or hydrosilylation reaction of the curing agent to the polymer backbone. Since noble metal compounds are generally expensive, commercially readily available platinum compounds are often used. Examples include chloroplatinic acid, complexes of chloroplatinic acid with olefins such as ethylene, complexes of chloroplatinic acid with alcohols or vinylsiloxanes, and solid catalysts in the form of platinum on silica, alumina or carbon. To obtain more uniform cured products, a solution of chloroplatinic acid or a complex thereof in a suitable solvent is admixed with the first component prior to use.

Known catalysts in the form of platinum group compounds other than the platinum compounds include rhodium, ruthenium, iridium and palladium compounds, for example, $RhCl(PPh_3)_3$, $RhCl(CO)(PPh_3)_2$, $RhCl(C_2H_4)_2$, $Ru_3(CO)_{12}$, $IrCl(CO)(PPh_3)_2$, and $Pd(PPh_3)_4$.

The amount of the catalyst used is not critical. Partially because of expensiveness, the catalyst is usually used in an amount of about 1 to 1,000 ppm, desirably about 10 to 500 ppm based on the organopolysiloxane.

For the rubber to be cured through condensation reaction, any of acetic acid, alcohol, oxime and acetone type curing agents may be selected so as to comply with a particular curing mechanism. Specifically, suitable condensation reaction curing agents are shown below.

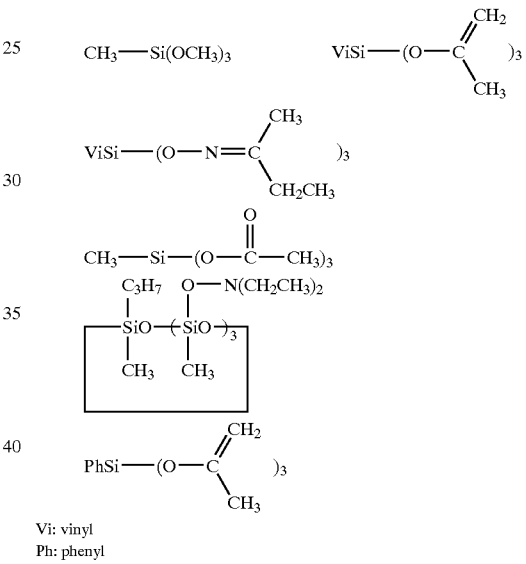

Vi: vinyl
Ph: phenyl

An appropriate amount of the condensation reaction curing agent used is about 2 to 15 parts by weight per 100 parts by weight of the organopolysiloxane.

For the rubber to be cured through condensation reaction, condensation reaction promoting catalysts are usually added in catalytic amounts. The catalysts include organic tin compounds, titanium compounds, and guanidyl group-containing compounds. Specific examples of the catalyst are shown below.

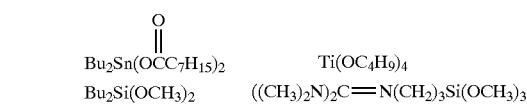

Next, reference is made to the fluororubber composition (II). The perfluoropolyether group-containing organosilicon compound used herein is preferably a fluorinated amide compound of the following general formula (1), as disclosed in JP-A 8-198926 of the same assignee as the present invention which is incorporated herein by reference.

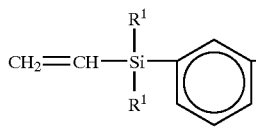 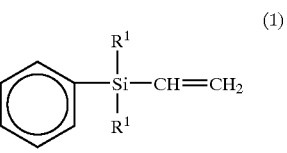 (1)

Herein, $R^1$ is a monovalent hydrocarbon group of 1 to 10 carbon atoms selected from among alkyl, cycloalkyl, alkenyl, aryl and aralkyl groups, and substituted ones of the foregoing groups in which some or all of the hydrogen atoms are replaced by halogen atoms. $R^2$ is hydrogen or a monovalent hydrocarbon group as defined for $R^1$. Q is a group of the following general formula (2) or (3).

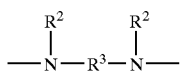 (2)

Herein, $R^3$ is a divalent hydrocarbon group of 1 to 20 carbon atoms, which may be separated by at least one of oxygen, nitrogen and silicon atoms, selected from among alkylene, cycloalkylene, and arylene groups, substituted ones of the foregoing groups in which some of the hydrogen atoms are replaced by halogen atoms, and combinations of such alkylene groups with arylene groups.

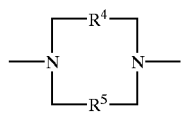 (3)

Herein, each of $R^4$ and $R^5$ is a divalent hydrocarbon group of 1 to 10 carbon atoms selected from among alkylene, cycloalkylene, and substituted ones of the foregoing groups in which some of the hydrogen atoms are replaced by halogen atoms.

Rf is a divalent perfluoroalkylene group of the formula: —$C_mF_{2m}$— wherein m is 1 to 10, or a divalent perfluoropolyether group selected from groups of the formulas shown below, and the letter "a" is an integer of 0 to 10.

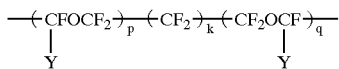

Y is F or $CF_3$ group, p, q and k are integers satisfying $p \geq 1$, $q \geq 1$, $2 \leq p+q \leq 200$, and $0 \leq k \leq 6$.

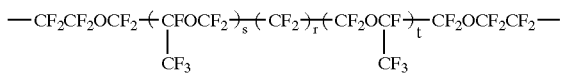

The letters r, s and t are integers satisfying $0 \leq r \leq 6$, $s \geq 0$, $t \geq 0$, and $0 \leq s+t \leq 200$.

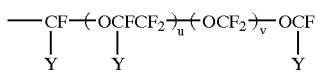

Y is F or $CF_3$ group, u and v are integers of 1 to 20.

The letter w is an integer of 1 to 100.

In formula (1), $R^1$ is a substituted or unsubstituted monovalent hydrocarbon group of 1 to 10 carbon atoms, especially 1 to 8 carbon atoms, and preferably free of aliphatic unsaturation; and $R^2$ is hydrogen or a monovalent hydrocarbon group like $R^1$. Examples of the monovalent hydrocarbon groups represented by $R^1$ and $R^2$ include alkyl groups such as methyl, ethyl, propyl, isopropyl, butyl, isobutyl, tert-butyl, pentyl, hexyl, octyl and decyl; cycloalkyl groups such as cyclopentyl, cyclohexyl and cycloheptyl; alkenyl groups such as vinyl, allyl, propenyl, isopropenyl, butenyl, isobutenyl, hexenyl and cyclohexenyl; aryl groups such as phenyl, tolyl, xylyl and naphthyl; aralkyl groups such as benzyl, phenylethyl, phenylpropyl and methylbenzyl; and substituted ones of the foregoing groups in which some or all of the hydrogen atoms are replaced by halogen atoms, typically halo-substituted alkyl groups such as chloromethyl, chloropropyl, bromoethyl, 3,3,3-trifluoropropyl and 6,6,6,5,5,4,4,3,3-nonafluorohexyl.

In formula (1), Q is a group of the general formula (2) or (3).

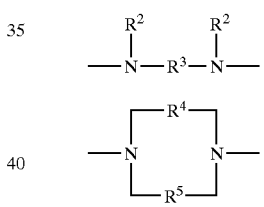

(2)

(3)

In formula (2), $R^2$ is as defined above. $R^3$ is a substituted or unsubstituted divalent hydrocarbon group of 1 to 20 carbon atoms, and especially 2 to 10 carbon atoms, for example, alkylene groups such as methylene, ethylene, propylene, methylethylene, butylene and hexamethylene; cycloalkylene groups such as cyclohexylene; arylene groups phenylene, tolylene, xylylene, naphthylene, and biphenylene; substituted ones of the foregoing groups in which some of the hydrogen atoms are replaced by halogen atoms or the like; and combinations of such substituted or unsubstituted alkylene groups with arylene groups.

$R^3$ may be a group as above in which at least one atom selected from among oxygen, nitrogen and silicon atoms intervenes midway the linkage. In this case, the oxygen atom may intervene in the form of —O—, and the nitrogen atom may intervene in the form of —NR'— wherein R' is hydrogen or an alkyl group of 1 to 8 carbon atoms, especially 1 to 6 carbon atoms or aryl group. The silicon atom may intervene as a straight or cyclic organosiloxane-containing group or organosilylene group as shown below.

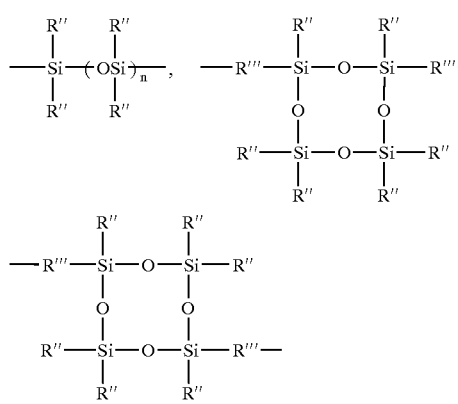

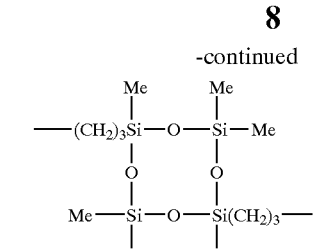   or

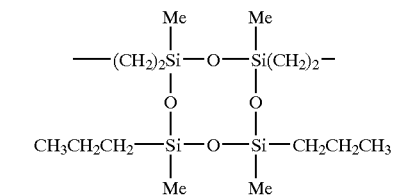

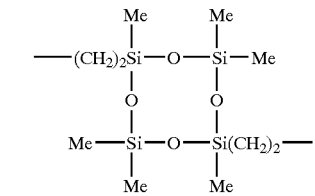

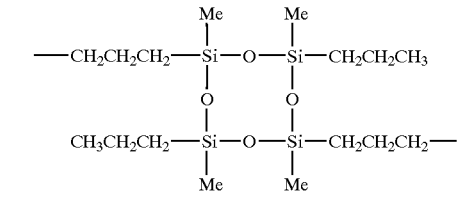

Herein, R'' is an alkyl group of 1 to 8 carbon atoms or aryl group as exemplified above for $R^1$ and $R^2$; R''' is an alkylene group of 1 to 6 carbon atoms or arylene group as exemplified above for $R^3$, and n is an integer of 0 to 10, and especially 0 to 5.

Illustrative examples of the groups separated by oxygen, nitrogen and silicon atoms are given below. Me is methyl.

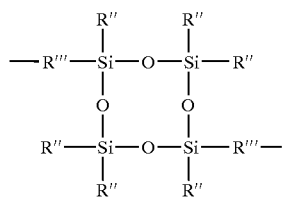

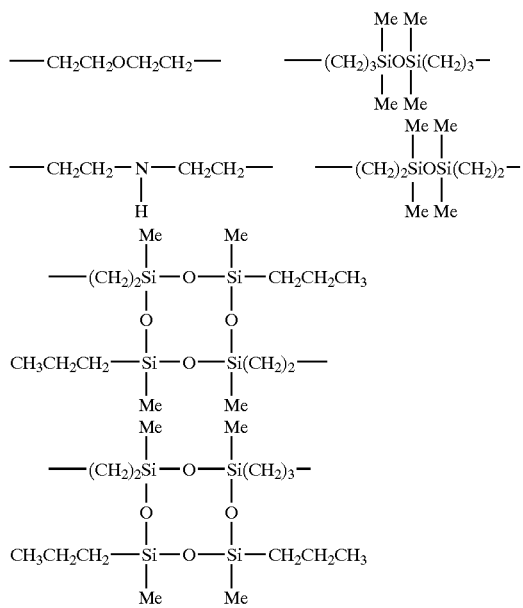

In formula (3), each of $R^4$ and $R^5$ is a substituted or unsubstituted divalent hydrocarbon group of 1 to 10 carbon atoms and especially 2 to 6 carbon atoms, for example, alkylene groups such as methylene, ethylene, propylene, methylethylene, butylene, and hexamethylene; cycloalkylene groups such as cyclohexylene; and substituted ones of the foregoing groups in which some of the hydrogen atoms are replaced by halogen atoms.

Illustrative examples of Q in formula (1), represented by formula (2) or (3), are given below. In the following chemical formulas, Me is methyl, Ph is phenyl, Rf is as defined above, and X is hydrogen, methyl or phenyl.

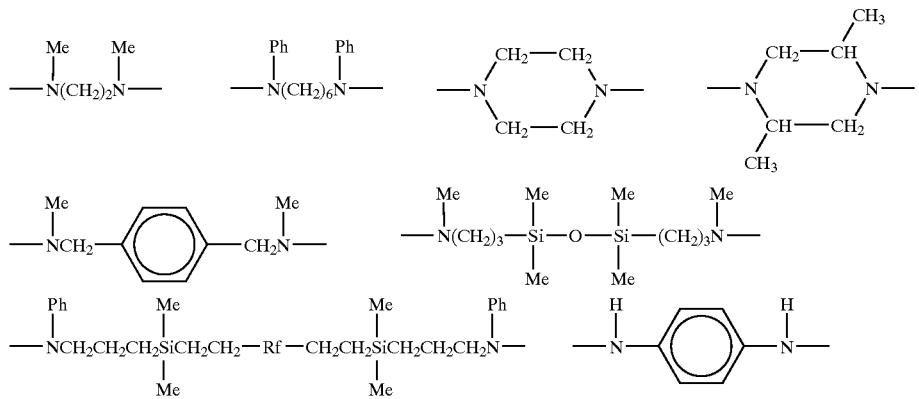

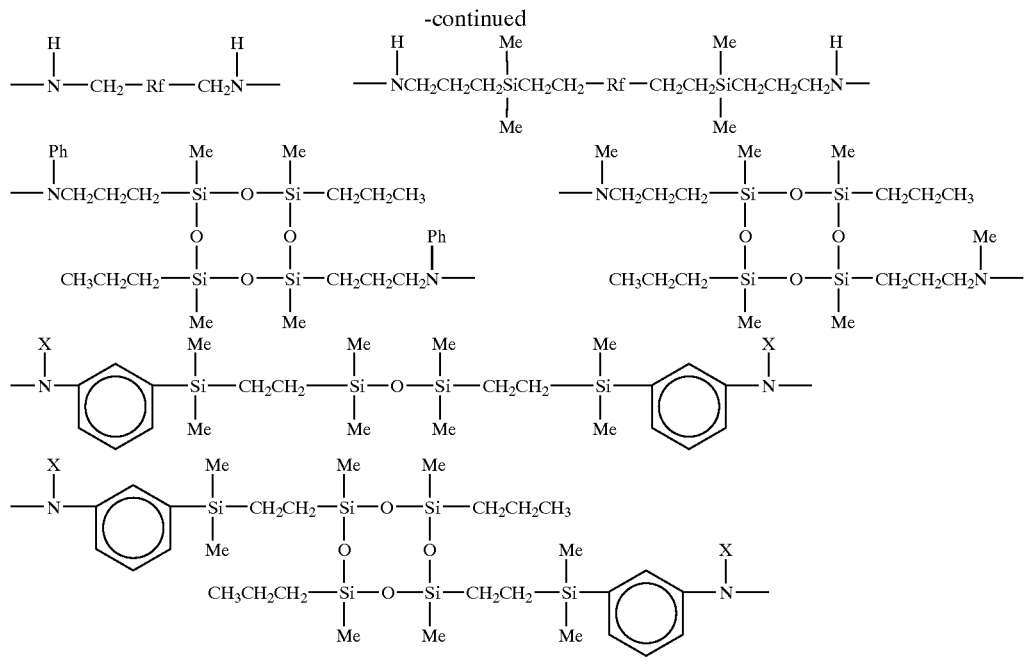

Illustrative examples of Rf in formula (1) are given below.

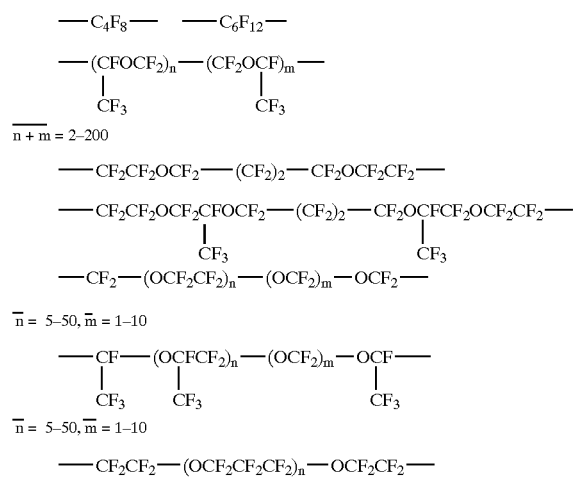

It is noted that in formula (1), "a" is an integer of 0 to 10, indicating that the fluorinated amide compound of formula (1) contains at least one divalent perfluoroalkylene group or divalent perfluoropolyether group per molecule. Preferably, "a" is an integer of 1 to 6.

It is appreciated that the fluorinated amide compound of formula (1) can be prepared by the method described in JP-A 8-198926.

Preferably, the fluorinated amide compound of formula (1) has a viscosity in the range of about 100 to 100,000 centistokes at 25° C., more preferably about 200 to 20,000 centistokes at 25° C.

The curing agent is selected so as to comply with the curing reaction of the perfluoropolyether group-containing organosilicon compound. Usually, an organohydrogenpolysiloxane having at least two, preferably at least three, hydroxyl (Si—H) groups in a molecule is used. Suitable addition reaction crosslinking agents are fluorinated organohydrogensiloxanes containing at least one group selected from among monovalent perfluorooxyalkyl, monovalent perfluoroalkyl, divalent perfluorooxyalkylene and divalent perfluoroalkylene groups, as well as at least two hydrosilyl groups.

The perfluorooxyalkyl, perfluoroalkyl, perfluorooxyalkylene and perfluoroalkylene groups are exemplified by the groups of the following general formulas. monovalent perfluoroalkyl groups:

Letter m is an integer of 1 to 20, preferably 2 to 10. divalent perfluoroalkylene groups:

Letter m is an integer of 1 to 20, preferably 2 to 10. monovalent perfluorooxyalkyl groups:

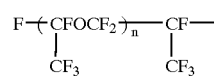

Letter n is an integer of 1 to 5. divalent perfluorooxyalkylene groups:

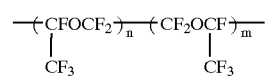

The sum of m+n is an integer of 2 to 100.

The fluorinated organohydrogensiloxane may be cyclic, chainlike or three-dimensional network. Preferred organohydrogensiloxane has in a molecule at least one organic group containing a perfluoroalkyl, perfluorooxyalkyl, perfluoroalkylene or perfluorooxyalkylene ether group, as represented by the following general formulas, as the substituent attached to a silicon atom.

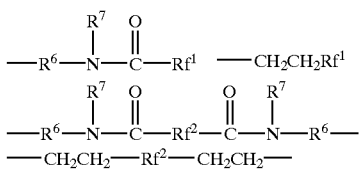

In the above formulas, $R^6$ is a divalent hydrocarbon group of 1 to 10 carbon atoms and especially 2 to 6 carbon atoms, for example, alkylene groups such as methylene, ethylene, propylene, methylethylene, tetramethylene, and hexamethylene; and arylene groups such as phenylene. $R^7$ is hydrogen or a monovalent hydrocarbon group of 1 to 8 carbon atoms and especially 1 to 6 carbon atoms, like $R^2$. $Rf^1$ and $Rf^2$ are independently monovalent perfluoroalkyl, monovalent perfluorooxyalkyl, divalent perfluorooxyalkylene or divalent perfluoroalkylene groups.

In the fluorinated organohydrogensiloxane, the substituents attached to silicon atoms other than the monovalent organic group having a mono- or divalent fluorinated substituent, that is, perfluoroalkyl, perfluorooxyalkyl, perfluorooxyalkylene or perfluoroalkylene group include monovalent hydrocarbon groups of 1 to 10 carbon atoms, especially 1 to 8 carbon atoms, free of aliphatic unsaturation, as defined for $R^2$. The number of silicon atoms in the molecule of the fluorinated organohydrogensiloxane is not critical although it desirably has about 2 to about 60 silicon atoms, more desirably about 4 to about 60 silicon atoms, and especially about 4 to about 30 silicon atoms.

Illustrative, non-limiting, examples of the fluorinated organohydrogensiloxane are given below.

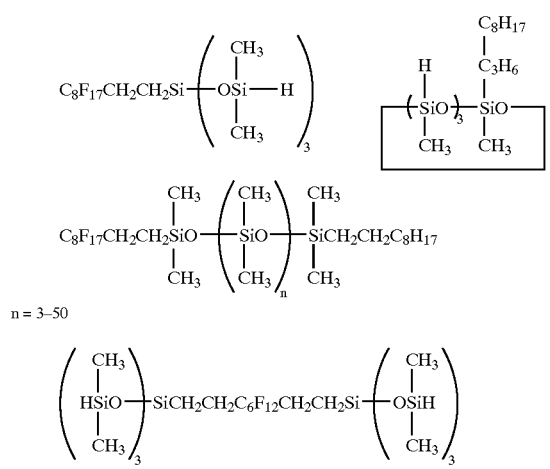

The fluorinated organohydrogensiloxane (B) is preferably blended in such amounts that 0.5 to 5 mol, and more preferably 1 to 2 mol of hydrosilyl (Si—H) groups in (B) are available per mol of aliphatic unsaturated groups including alkenyl and cycloalkenyl groups in the perfluoropolyether group-containing compound (A). Less amounts of component (B) may achieve an insufficient degree of crosslinking. Excessive amounts of component (B) may allow chain lengthening to become preferential, inviting undercure, foaming, and losses of heat resistance and other properties. An appropriate amount of component (B) blended is 0.1 to 50 parts by weight per 100 parts by weight of component (A).

Along with the addition reaction crosslinking agents, addition reaction promoting catalysts such as platinum group compounds as previously described are blended in catalytic amounts if necessary.

The silica filler used herein has a mean particle size of 0.001 to 10 μm, and preferably 0.01 to 1.0 μm. Preferably the silica filler has a specific surface area of at least 50 m²/g, and especially 100 to 500 m²/g as measured by the BET method.

The silica filler may be selected from commonly used reinforcing silica (inclusive of dry silica and wet silica) and non-reinforcing silica. Examples of useful silica include fumed silica obtained by burning of silicon tetrachloride, hydrolytic silica obtained by hydrolysis of silicon tetrachloride, silica flour obtained by grinding naturally occurring quartz, spherical silica obtained by melting of quartz, and surface treated silica obtained by surface treating the respective silicas with chlorosilane, silazane, etc.

An appropriate amount of the silica filler blended is about 5 to 200 parts, and especially about 10 to 100 parts by weight per 100 parts by weight of the composition. With too less an amount of silica, the cured rubber may have a low tensile strength. Too large an amount of silica may reduce the elongation of the cured rubber.

According to the invention, the curable composition comprising the polymer, curing agent therefor, and silica filler described above is cured under suitable conditions for its curing reaction to form a cured rubber, which is post treated with a vapor of a hydrolyzable aminosilane or hydrolyzable amidosilane having a Si—N bond.

The curing conditions for the curable composition are not critical as long as a sufficient amount of heat to induce decomposition of the curing agent and vulcanization of rubber is applicable; and the molding method is not critical and usually selected, for example, from extrusion molding concomitant with continuous vulcanization, press molding and injection molding. The curing conditions are selected in accordance with the molding method and usually include a temperature of about 80 to 200° C. and a time of about 5 seconds to 30 minutes. If necessary, this is followed by secondary vulcanization at about 150 to 250° C. for about 1 to 10 hours.

The hydrolyzable aminosilane and amidosilane each having a Si—N bond with which the cured rubber is treated are not critical and may have various structures including straight, branched and cyclic structures. Illustrative, non-limiting, examples are given below. Vi is vinyl.

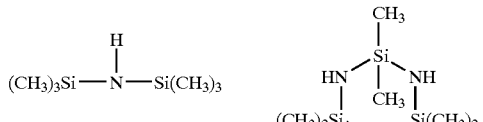

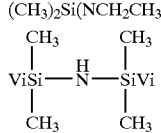

Vi: Vinyl

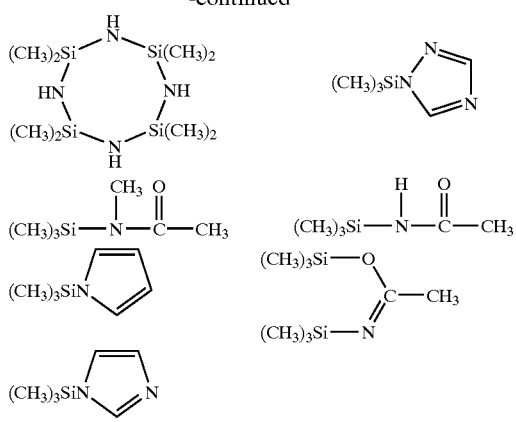

An appropriate amount of the hydrolyzable aminosilane or amidosilane used is about 0.5 to 30 parts by weight, especially about 1.0 to 20 parts by weight per 100 parts by weight of the cured rubber. Too small an amount of the silane relative to the cured rubber may fail to achieve sufficient treatment to improve compression set. Too large an amount of the silane is wasteful.

In the practice of the invention, the cured rubber is post treated, for example, by admitting the hydrolyzable aminosilane or amidosilane in a closed container, causing the silane to vaporize so that the container is full of the silane vapor, placing the cured rubber into the container so as to be in contact with the vapor, but not with the silane, and keeping the vapor contact at an appropriate temperature for an appropriate time.

Treating conditions may be properly selected. Preferred conditions include a treating temperature of about 10 to 80° C., especially about 20 to 60° C. and a treating time of about 1 to 168 hours, especially about 24 to 96 hours. At the end of treatment, the cured rubber is taken out of the container if necessary, and heat treated at 120 to 150° C. to remove the treating agent, yielding the end cured rubber as treated.

The cured rubber as treated is significantly improved in compression set so that it is applicable to a variety of uses, for example, as O-rings, diaphragms, and valves. More specifically, rubber articles made of the cured compositions include rubber parts for automobiles, for example, diaphragms such as fuel regulator diaphragms, pulsation damper diaphragms, oil pressure switch diaphragms, and EGR diaphragms, valves such as canister valves and power control valves, O-rings such as quick connector O-rings and injector O-rings, and seals such as oil seals and cylinder head gaskets; rubber parts for chemical plants, for example, pump diaphragms, valves, O-rings, packings, oil seals, and gaskets; rubber parts for ink jet printers and semiconductor manufacturing lines, for example, diaphragms, valves, O-rings, packings, and gaskets; rubber parts for analytical and scientific instruments and medical equipment, for example, pump diaphragms, O-rings, packings, valves, and joints; tent film materials, sealants, molded parts, extruded parts, coatings, copier roll materials, fuel cell seals, laminate rubber fabrics; and rubber parts for aircraft, for example, O-rings, face seals, packings, gaskets, diaphragms, and valves in fluid piping for engine oil, jet fuel, hydraulic oil and Skydrol®.

With the treating method of the invention, cured rubber parts having superior cured properties are manufactured in an efficient manner using a minimal amount of silane. With the inventive method, cured rubber parts having significantly improved compression set are obtainable which can be utilized in a variety of applications including O-rings and square rings in fuel, lubricant and working fluid systems of automobiles and aircraft, O-rings in semiconductor devices, rolls in copiers, molded rubber parts for sealing purposes, and diaphragms.

EXAMPLE

Examples of the invention are given below by way of illustration and not by way of limitation. All parts are by weight, and the viscosity is a measurement at 25° C.

Examples 1–4 and Comparative Examples 1, 2

To 100 parts of a polymer of formula (i) shown below having a viscosity of 5,900 centistokes, an average molecular weight of 17,000 and a vinyl group content of 0.012 mol/100 g, was added 20 parts of fumed silica surface treated with dimethylsiloxy groups and having a specific surface area of 200 m²/g and a mean particle size of 0.01 μm. After mixing and heat treatment, the mixture was milled on a three-roll mill. To this were added 3.29 parts of a fluorinated cyclic hydrogensiloxane of formula (ii) shown below, 0.2 part of a toluene solution of a catalyst in the form of chloroplatinic acid modified with $CH_2=CHSi(CH_3)_2OSi(CH_3)_2CH=CH_2$ (platinum concentration 1.0% by weight), and 0.4 part of a 50% toluene solution of ethynyl cyclohexanol. The ingredients were mixed to give a composition.

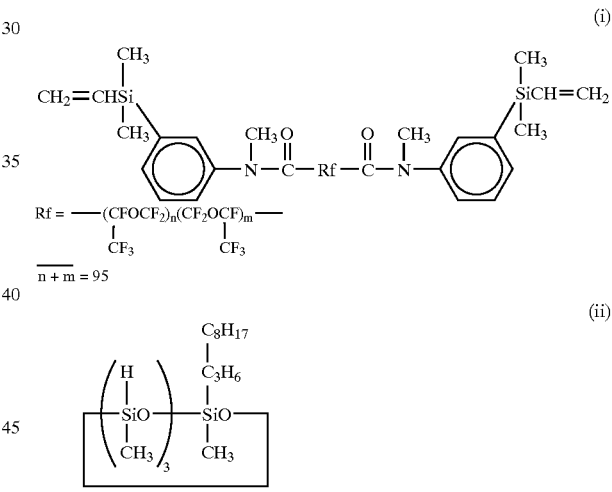

The composition was deaerated in vacuum, placed in a rectangular frame of 2 mm thick, deaerated again, press cured at 100 kgf/cm² and 150° C. for 10 minutes, and post cured at 200° C. for 4 hours. A test specimen cut out of the cured sample was measured for physical properties according to JIS K-6301, with the results shown below.

| Hardness: | 57 on JIS A scale* |
|---|---|
| Elongation: | 290% |
| Tensile strength: | 70 kgf/cm² |

*measured by a Type A spring hardness tester as prescribed in JIS K-6301

For compression set measurement, the above composition was molded in a special mold to form O-rings having an inner diameter of 24.99 mm and a diameter of 3.52 mm. Like the cured sheet, the curing procedure involved press curing at 100 kgf/cm² and 150° C. for 10 minutes and post curing at 200° C. for 4 hours. The O-rings were then treated with a hydrolyzable aminosilane or amidosilane under the following conditions in the combination shown in Table 1, obtaining treated O-rings. Before and after the treatment, the compression set of the O-rings was measured at 25% compression and 200° C. The results are shown in Table 1.

Hydrolyzable Aminosilane and Amidosilane

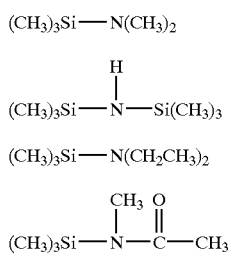

Treating Procedure of Examples 1 to 4

Each hydrolyzable aminosilane or amidosilane, 1.0 g (5.6 pbw), was charged in a closed container. Ten O-rings (18 g or 100 pbw) were placed in the container so that they were not in contact with the silane. The O-rings were treated in the silane vapor at 25° C. for 48 hours. The O-rings were then taken out of the container and transferred to a dryer where they were heated at 150° C. for 2 hours for removing the silane and condensate thereof, yielding treated O-rings.

Treating Procedure of Comparative Example 2

As in U.S. Pat. No. 6,410,641 and EP 1125973A, ten O-rings (18 g or 100 pbw) were immersed in a solution of 15 g (83.3 pbw) of Silane I, 350 g of m-xylene hexafluoride and 150 g of perfluorobutyltetrahydrofuran, treated therewith at 90° C. for 24 hours, taken out of the solution, and dried at 120° C. for 2 hours for removing the silane and solvent, yielding treated O-rings.

TABLE 1

|  |  | Post treatment | Compression set (25%, 200° C.) | | | |
|---|---|---|---|---|---|---|
|  |  |  | 22 hr | 70 hr | 240 hr | 500 hr |
| Example | 1 | Silane I vapor | 8 | 14 | 30 | 45 |
|  | 2 | Silane II vapor | 9 | 15 | 31 | 51 |
|  | 3 | Silane III vapor | 7 | 13 | 28 | 44 |
|  | 4 | Silane IV vapor | 9 | 15 | 32 | 50 |
| Comparative Example | 1 | untreated | 21 | 38 | 57 | 85 |
|  | 2 | Silane I solution | 7 | 13 | 29 | 45 |

Examples 5–8 and Comparative Examples 3, 4

To 100 parts of a dimethylpolysiloxane capped with a vinyldimethylsilyl group at each end, having a viscosity of 5,300 centistokes and a vinyl group content of 0.006 mol/100 g, was added 20 parts of fumed silica surface treated with dimethylsiloxy groups and having a specific surface area of 200 m²/g and a mean particle size of 0.01 μm. After mixing and heat treatment, the mixture was milled on a three-roll mill. To this were added 1.5 parts of a hydrogensiloxane of formula (iii) shown below having a Si—H content of 0.006 mol/g, 0.2 part of a toluene solution of a catalyst in the form of chloroplatinic acid modified with $CH_2$=CHSi$(CH_3)_2$OSi$(CH_3)_2$CH=$CH_2$ (platinum concentration 1.0% by weight), and 0.4 part of a 50% toluene solution of ethynyl cyclohexanol. The ingredients were mixed to give a composition.

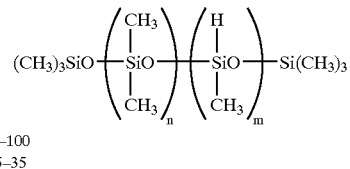

n = 0–100
m = 5–35

The composition was deaerated in vacuum, placed in a rectangular frame of 2 mm thick, deaerated again, press cured at 100 kgf/cm² and 150° C. for 10 minutes, and post cured at 200° C. for 4 hours. A test specimen cut out of the cured sample was measured for physical properties according to JIS K-6301, with the results shown below.

| Hardness: | 53 on JIS A scale* |
|---|---|
| Elongation: | 180% |
| Tensile strength: | 65 kgf/cm² |

*measured by a Type A spring hardness tester as prescribed in JIS K-6301

For compression set measurement, the above composition was molded in a special mold to form O-rings having an inner diameter of 24.99 mm and a diameter of 3.52 mm. Like the cured sheet, the curing procedure involved press curing at 100 kg/cm² and 150° C. for 10 minutes and post curing at 200° C. for 4 hours. In Examples 5 to 8, the O-rings were then treated with silane vapor as in Examples 1 to 4, obtaining treated O-rings. In Comparative Example 4, the O-rings were treated with silane solution as shown below, obtaining treated O-rings. Before and after the treatment, the compression set of the O-rings was measured at 25% compression and 180° C. The results are shown in Table 2.

Treating Procedure of Comparative Example 4

As in U.S. Pat. No. 6,410,641 and EP 1125973A, ten O-rings (18 g or 100 pbw) were immersed in a solution of 15 g (83.3 pbw) of Silane I and 500 g of toluene, treated therewith at 90° C. for 24 hours, taken out of the solution, and dried at 120° C. for 2 hours for removing the silane and solvent, yielding treated O-rings.

TABLE 2

|  |  | Post treatment | Compression set (25%, 180° C.) | | | |
|---|---|---|---|---|---|---|
|  |  |  | 22 hr | 70 hr | 240 hr | 500 hr |
| Example | 5 | Silane I vapor | 10 | 18 | 34 | 48 |
|  | 6 | Silane II vapor | 11 | 21 | 38 | 54 |
|  | 7 | Silane III vapor | 9 | 18 | 33 | 45 |
|  | 8 | Silane IV vapor | 12 | 22 | 40 | 58 |
| Comparative Example | 3 | untreated | 18 | 32 | 51 | 70 |
|  | 4 | Silane I solution | 11 | 19 | 36 | 51 |

It is evident from Tables 1 and 2 that the O-rings treated with hydrolyzable aminosilane or amidosilane vapor are significantly improved in compression set over the untreated rings. As compared with the method of U.S. Pat. No. 6,410,641 and EP 1125973A, equivalent results are obtained with a minimized amount of silane used relative to the weight of cured rubber to be treated.

Japanese Patent Application No. 2002-292079 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A method for the treatment of a cured rubber made of a curable rubber composition comprising a curable organopolysiloxane, a curing agent therefor, and a silica filler having a mean particle size of 0.001 to 10 μm, the method comprising the step of post-treating 100 parts by weight of the cured rubber with 0.5 to 30 parts by weight of a hydrolyzable aminosilane or amidosilane having a Si—N bond in vapor form.

2. A method for the treatment of a cured rubber made of a curable rubber composition comprising a curable perfluoropolyether group-containing organosilicon compound, a curing agent therefor, and a silica filler having a mean particle size of 0.001 to 10 μm, the method comprising the step of post-treating 100 parts by weight of the cured rubber with 0.5 to 30 parts by weight of a hydrolyzable aminosilane or amidosilane having a Si—N bond in vapor form.

3. The method of claim 1 wherein the post-treating is conducted at a temperature of about 10 to 80° C., for about 1 to 168 hours.

4. The method of claim 2 wherein the post-treating is conducted at a temperature of about 10 to 80° C., for about 1 to 168 hours.

5. The method of claim 1 wherein the post-treating is conducted at a temperature of about 20 to 60° C., for about 24 to 96 hours.

6. The method of claim 2 wherein the post-treating is conducted at a temperature of about 20 to 60° C., for about 24 to 96 hours.

7. The method of claim 1 wherein the step of post-treating employs 100 parts by weight of the cured rubber with 1.0 to 20 parts by weight of a hydrolyzable aminosilane or amidosilane.

8. The method of claim 2 wherein the step of post-treating employs 100 parts by weight of the cured rubber with 01.0 to 20 parts by weight of a hydrolyzable aminosilane or amidosilane.

* * * * *